United States Patent [19]

Fukunaga et al.

[11] Patent Number: 5,154,673
[45] Date of Patent: Oct. 13, 1992

[54] TRANSMISSION WEIGHT ROLLER

[75] Inventors: Hisao Fukunaga, Himeji; Hirokazu Okawa, Sennan, both of Japan

[73] Assignees: Bando Chemical Industries, Ltd., Kobe; Honda Giken Kogyo Kabushiki Kaisha, Tokyo, both, Japan

[21] Appl. No.: 538,892

[22] Filed: Jun. 18, 1990

[30] Foreign Application Priority Data

Jun. 19, 1989 [JP] Japan .................. 1-157285

[51] Int. Cl.$^5$ .................................. F16H 61/00
[52] U.S. Cl. ........................... 474/13; 474/44; 474/70
[58] Field of Search ................. 474/13-15, 474/32-36, 44, 70; 29/132, 895.21, 895.212, 895.213, 895.23

[56] References Cited

U.S. PATENT DOCUMENTS

| | | | |
|---|---|---|---|
| 1,926,312 | 9/1933 | Smith | 29/122 |
| 3,714,693 | 2/1973 | Peterson | 29/132 |
| 3,724,047 | 4/1973 | Peterson | 29/132 X |
| 3,737,963 | 6/1973 | Postulka et al. | 29/132 X |
| 4,098,631 | 7/1978 | Stryjewski | 29/132 X |

FOREIGN PATENT DOCUMENTS

| | | | |
|---|---|---|---|
| 60-245865 | 5/1985 | Japan | |
| 60-245864 | 12/1985 | Japan | |
| 61-157859 | 7/1986 | Japan | |
| 61-157860 | 7/1986 | Japan | |
| 61-157863 | 7/1986 | Japan | |
| 61-163821 | 7/1986 | Japan | |
| 61-165058 | 7/1986 | Japan | |
| 61-180057 | 8/1986 | Japan | |
| 61-180061 | 8/1986 | Japan | |
| 35161 | 2/1989 | Japan | 474/13 |

Primary Examiner—Ramon S. Britts
Assistant Examiner—Roger J. Schoeppel
Attorney, Agent, or Firm—Marshall, O'Toole, Gerstein, Murray & Bicknell

[57] ABSTRACT

A weight roller for an automatic transmission or a centrifugal clutch, comprising a core covered by an outer resin. The resin is formed into a cylinder having inwardly protruding collars at the ends thereof, and the core is mountable within the resin collar, the core having at least one chamfered edge which enables the core to be inserted into the resin. The resin comprises nylon and a reinforcing material comprising an aramid fiber (aromatic polyamide fiber) and a self-lubricant comprising polytetrafluoroethylene resin (PTFE) with an addition, if necessary, of polyolefine resin.

2 Claims, 5 Drawing Sheets

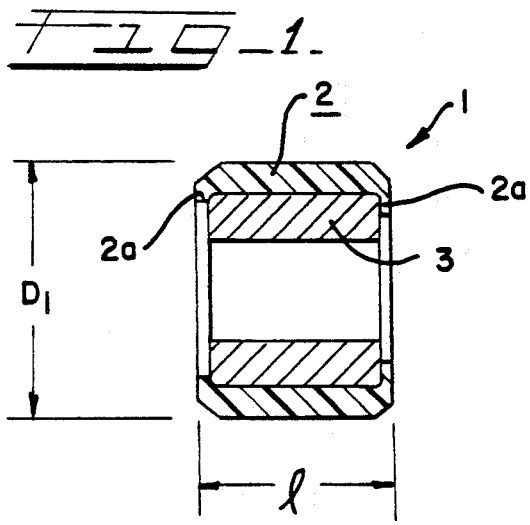
FIG_1.
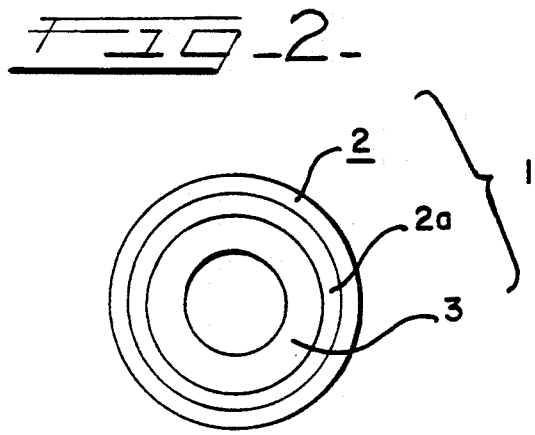
FIG_2.
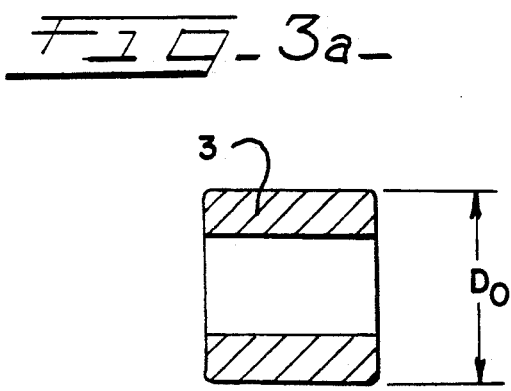
FIG_3a.
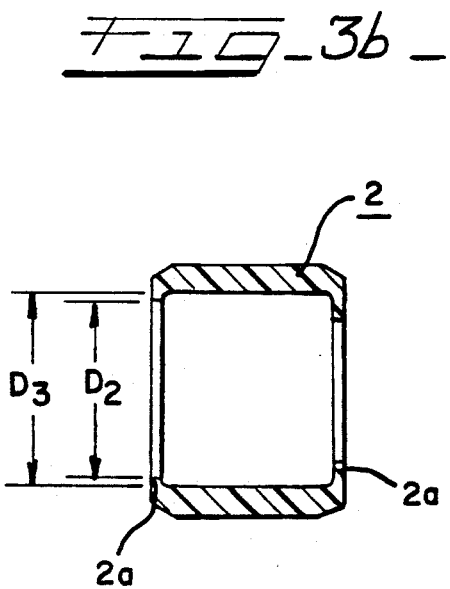
FIG_3b.

FIG. 4.

| COMPOSITION | EMBODIMENTS | | | | CONTROLS | | | |
|---|---|---|---|---|---|---|---|---|
| | 1 | 2 | 3 | 4 | 1 NYLON 66. WITHOUT GREASE | 2 NYLON 66 WITH GREASE LUBRI- CATION | 3 NYLON 66 GLASS FIBER PTFE | 4 NYLON 66 GLASS FIBER |
| NYLON 46 | 85.0 | 80.0 | 76.0 | 72.0 | 100 | 100 | | |
| ARAMIDE FIBER | 5.0 | 5.0 | 5.0 | 5.0 | | | | |
| PTFE | 10.0 | 15.0 | 15.0 | 15.0 | | | 33.0 | |
| HDPE | 0 | 0 | 4.0 | 8.0 | | | | |
| NYLON 66 | | | | | | | 52.0 | 70.0 |
| GLASS FIBER | | | | | | | | 30.0 |
| PTFE (control) | | | | | | | 15.0 | |
| TENSILE STRENGTH (kg/cm²) | 898 | 872 | 856 | 831 | 830 | 830 | 1900 | 2400 |
| BENDING STRENGTH (kg/cm²) | 1309 | 1225 | 1163 | 1080 | 1200 | 1200 | 2650 | 3500 |
| MODULUS OF ELASTICITY, BENDING (kg/cm²) | $3.3 \times 10^4$ | $3.2 \times 10^4$ | $2.9 \times 10^4$ | $2.8 \times 10^4$ | $2.9 \times 10^4$ | $2.9 \times 10^4$ | $9.5 \times 10^4$ | $17.5 \times 10^5$ |
| IZOT IMPACT STRENGTH (kgcm/cm) | 4.9 | 5.6 | 5.9 | 6.0 | 4.0~5.0 | 4.0~5.0 | 7.5~8.5 | 7.0~8.0 |
| FATIGUE LIFE (CYCLE) | $1.2 \times 10^5$ | $1.1 \times 10^5$ | $1.7 \times 10^5$ | $1.4 \times 10^5$ | $8.0 \times 10^5$ | $8.0 \times 10^5$ | $0.2 \times 10^5$ | $0.1 \times 10^5$ |
| SUZUKI TYPE ABRASION TESTER | | | | | | | | |
| FRICTION COEFFICIENT | 0.35 | 0.12 | 0.11 | 0.18 | 0.46 | 0.25 | 0.45 | 0.36 |
| WEAR (mg) ON THE RESIN | 0.03 | 1.17 | 1.17 | 0.27 | 25.74 | 4.68 | 0.25 | 0.15 |
| WEAR (mg) ON THE ALUMINUM PLATE | 0.20 | 0.13 | 0.04 | 0.12 | 1.25 | 0.25 | 1.86 | 1.28 |
| FIELD RUNNING CHARACTERISTICS | | | | | | | | |
| WEAR (mg) ON THE RESIN | 0.02 | 0.03 | 0.03 | 0.04 | 2.45 | 0.23 | 0.12 | 0.08 |
| WEAR (mg) ON THE ALUMINUM PLATE | 0.002 | 0.002 | 0.002 | 0.002 | 0.005 | 0.002 | 0.05 | 0.03 |
| DETERIORATION IN SPEED RATIO (%) | 3~5 | 4~6 | 4~6 | 5~8 | 20~30 | 13~14 | 12~13 | 10~12 |

Fig. 5

| METHOD FOR FIXING THE CORE | | EMBODIMENT OF THE INVENTION | CONTROLS | | | |
|---|---|---|---|---|---|---|
| | | FORCED FITTING | INSERT MOLDING | | | |
| | | | | | DISK | |
| PRODUCTION CONDITIONS | GATE FORM | DISK | EDGE | PIN POINT | FLAT | KNURLING |
| | CORE SURFACE | FLAT | FLAT | FLAT | FLAT | FLAT |
| TEST RESULTS | OUTER DIAMETER SHRINKAGE RATE (%) | 1.2 | 1.0 | 1.1 | 0.4 | 0.3 |
| | OUT OF ROUNDNESS | 0.03 | 0.09 | 0.05 | 0.03 | 0.03 |
| | CRACK | NONE | BREAKAGE AT 1000 km | BREAKAGE AT 1500 km | CRACK GENERATED | CRACK GENERATED |
| | BIASED WEAR (mm) | 0.03 | 0.12 AT 1000 km | 0.11 AT 1500 km | 0.04 | 0.04 |
| 9000 km RUNNING TEST RESULTS | | ○ | × | × | ×～△ | ×～△ |

FIG. 6

| $D_O - D_I$ (ALLOWANCE FOR FITTING) (%) | 0 | 1 | 1.5 | 2 | 2.5 | 3 | 3.5 | 4 | 5 |
|---|---|---|---|---|---|---|---|---|---|
| CRACKING OF THE RESIN DURING FORCED FITTING | NONE | NONE | NONE | NONE | NONE | NONE | NONE | A LITTLE PRESENT | PRESENT |
| SEPARATION OF THE RESIN FROM THE CORE DURING SERVICE | PRESENT | PRESENT | NONE | NONE | NONE | NONE | NONE | NONE | — |
| OPTIMAL RANGE | | | | ←OPTIMAL RANGE→ | | | | | |

FIG. 7

| $D_3 - D_O$ (m) | -0.4 | -0.3 | -0.2 | -0.1 | 0 | 0.1 | 0.2 | 0.3 | 0.4 | 0.5 |
|---|---|---|---|---|---|---|---|---|---|---|
| CRACKING OF THE RESIN DURING INSERTION | PRESENT | A LITTLE PRESENT | NONE | NONE | NONE | NONE | NONE | NONE | NONE | NONE |
| CRACKING OF THE RESIN DURING SERVICE | PRESENT | PRESENT | PRESENT | A LITTLE PRESENT | NONE | NONE | NONE | NONE | NONE | NONE |
| LOOSENESS | — | — | — | NONE | NONE | NONE | NONE | NONE | A LITTLE PRESENT | A LITTLE PRESENT |
| OPTIMAL RANGE | | | | | ←OPTIMAL RANGE→ | | | | | |

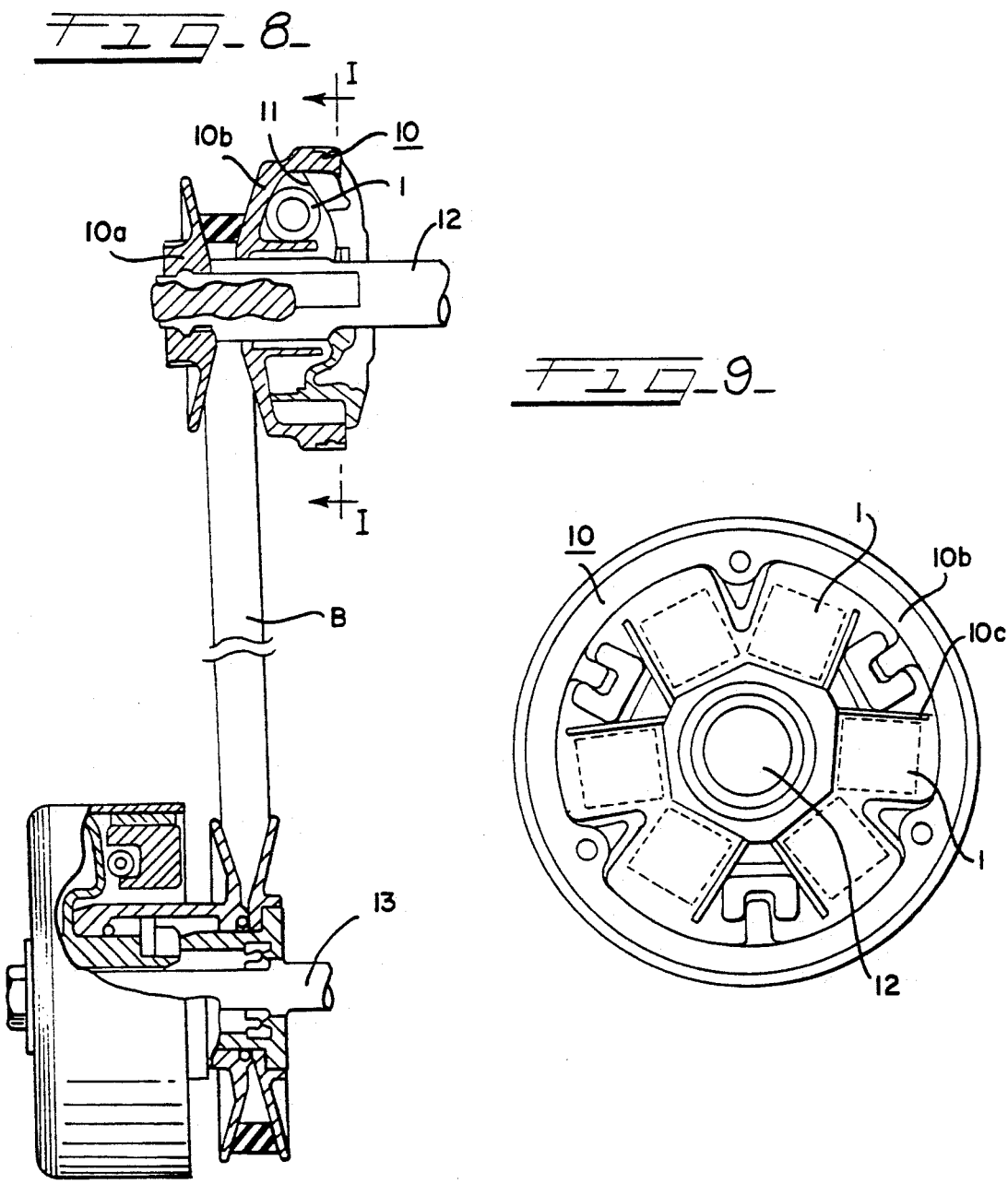

TRANSMISSION WEIGHT ROLLER

FIELD AND BACKGROUND OF THE INVENTION

The present invention relates to weight rollers of the type used in centrifugal automatic transmissions or centrifugal clutches or the like found in motorbikes (broadly defined to include motor scooters), snow vehicles, propelled boats, or four-wheeled vehicles, or auxiliary mechanisms mounted on the above-mentioned vehicles such as superchargers, or agricultural machines, or general industrial machines.

Motorbikes or the like are provided with an automatic transmission which automatically changes the speed transmitted from a driving shaft to a driven shaft when the rotational speed of the engine changes. It operates by changing the width of a pulley groove, thus changing the radial contact position on the pulley of a power transmission belt (hereinafter simply referred to as transmission belt) such as an endless V-belt mounted around the pulley.

The mechanism for varying the groove width according to the rotational speed of the engine is arranged as illustrated in FIGS. 8 and 9 herein. The pulley 10 of which the groove width can be changed is comprised of a fixed plate 10a fastened to a rotary shaft 12 and a movable plate 10b movable axially of the rotary shaft 12. A guide plate surface 11 is formed on the rear side of the movable plate 10b and fixed to the rotary shaft 12. The gap between the guide plate surface 11 and the movable plate 10b gets narrower radially outwardly. Cylindrical weight rollers 1 are provided between the guide plate surface 11 and the movable plate 10b and are radially movable. The rollers 1 also rotate with the plates 10a and 10b. To restrain the weight rollers 1 from moving circumferentially relative to the plate 10b when they move radially on the pulley 10, the movable plate 10b (or guide plate surface) is provided with radial guides (or grooves) 10c (see FIG. 9), in each of which a weight roller 1 is arranged.

This mechanism works as follows: As the rotational speed of the rotary shaft 12 increases, the centrifugal forces acting on the weight rollers 1 will gradually increase, and the weight rollers 1 will shift on the rear surface 11 of the movable plate 10b in the direction of the centrifugal forces (or radially outward direction of the pulley) to shift the movable plate 10b axially towards the fixed plate 10a. As a result, the space between the movable plate 10b and the fixed plate 10a (which is the width of the pulley groove) will become narrower. Hence, in this arrangement, as the rotational speed of the rotary shaft increases, the endless transmission belt B mounted around the pulley will shift outwardly and contact the pulley nearer the outer circumference of the pulley. The effective diameter of the pulley 10 thus increases and the circumferential speed of the transmission belt on the pulley gradually increases. Thus, if the rotary shaft 12 is a driving shaft, the pulley size will change in such a way that the ratio of the speed of the driving shaft 12 and the transmitted speed of the driven shaft 13 increases automatically.

The weight rollers are required to have a high wear resistance since they will move (sliding rotation) radially continuously over the rear surface of the movable plate in response to any change in the rotational speed of the rotary shaft. To make this movement respond smoothly to any change in the rotational speed, the contacting circumferential surface of the weight rollers must have a small friction resistance.

When the mechanism is installed near an engine, the temperature of the weight rollers will rise to a considerable level, more specifically, to about 130° C., due to the heat transferred from the engine and the frictional heat of the weight rollers themselves. Thus the weight rollers must also have an excellent heat resistance.

The weight rollers are also required to have an excellent fatigue resistance (load bearing capacity) since they must press the movable plate, opposing the transmitted force acting via the transmission belt, and they are exposed to repeated impactive oscillatory stresses from the engine.

To meet the aforementioned requirements, a variety of devices have been proposed up to the present. Typical inventions include the so-called wet type wherein grease is filled in the storage spaces for weight rollers (Japanese Patent Early Publication No. SHO-60-245864), and the so-called dry type wherein the surface of the weight rollers is covered with a material mixed with a self-lubricating reinforcing fiber to ease maintenance (Japanese Patent Early Publication No. SHO-60-245864).

In the former case, however, there are disadvantages such that, when the space is heated, the viscosity of the grease will drop, which will be scattered around by the centrifugal force, and that the grease deteriorates due to aging, and stable sliding properties and in turn speed changing properties cannot be maintained over a long period.

In the latter case (the dry type), the device is free of the aforementioned demerits. However, there is a disadvantage that, when the pulley is made by aluminum die casting for lighter weight and higher workability, the reinforcing fibers covering the weight rollers will damage the sliding surface on the rear of the movable aluminum plate, and as a result, stable speed changing properties cannot be assured. In particular, when molybdenum disulfide or graphite with a high specific weight is used as the lubricant, the contact parts such as the sliding surface tend to be damaged.

The aforementioned problems are also present for the weight rollers used in centrifugal clutches utilizing basically the same principle.

The weight rollers of the type wherein their surface is covered with a self-lubricating resin or the like have been produced mainly by injection-molding a resin in a mold in which a preheated metallic core has been placed beforehand, as disclosed in Japanese Patent Early Publications No. SHO-61-165058 and No. SHO-61-163821.

The weight rollers thus produced, however, generate internal stress in the resin portion thereof after production since the materials of the core and the resin portion are different and, in turn, have different thermal shrinkage rates. As a result, such weight rollers have a disadvantage that cracks are generated in the resin portion thereof within a relatively short time.

Weight rollers are required to be produced inexpensively since they are used frequently in mass-produced goods such as motorbikes. When weight rollers have been produced by the aforementioned methods, it has not been possible to reduce the production costs below a certain level because of the difficulty of automating the production thereof, etc.

The present invention has been made in view of the foregoing situation, and is intended to provide weight rollers, which are free of the aforementioned disadvantages, for automatic transmissions or centrifugal clutches, and are arranged in such a way that the production thereof can be made easily without generating internal stresses in the resin portion.

SUMMARY OF THE INVENTION

According to a first aspect of the invention, weight rollers are provided for use in an automatic transmission having a pulley of which the pulley groove width varies as a movable plate moves relative to a fixed plate, or in a centrifugal clutch of a type wherein a friction plate and a counterpart plate arranged opposingly to each other on two concentric shafts are pressed together or released from each other to connect or disconnect the two shafts, as members for responding to the revolution speed that actuate a movable member or members such as the movable plate or the friction plate and counterpart plate, the weight rollers being characterized in that a resin that covers the circumferential surface of the weight rollers contains a reinforcing material comprising aramid fiber (aromatic polyamide fiber) and a self-lubricant comprising polytetrafluoroethylene resin (PTFE) with an addition, if necessary, of polyolefine resin, and is a resin of which the base resin is nylon 46 resin (polyamide resin: polytetramethyleneadipamide resin).

According to a second aspect of the invention, weight rollers are provided for use in an automatic transmission having a pulley of which the pulley groove width varies as a movable plate moves relative to a fixed plate, or in a centrifugal clutch of a type wherein a friction plate and a counterpart plate arranged opposingly to each other on two concentric shafts are pressed together or released from each other to connect or disconnect the two shafts, as members for responding to the revolution speed that actuate a movable member or members such as the movable plate or the friction plate and counterpart plate, the weight roller having a core of which the circumference is covered with a resin, the weight rollers being characterized in that the resin is formed into a cylinder having inwardly protruding collars on both ends thereof, the core is formed into a cylinder or column mountable inside the resin, the core being chamfered at least on one circumferential edge or end thereof, and at least one of the collars has an inner diameter whereby the core, with its chamfered edge first, is capable of being forced into the collar being elastically deformed, and the core, with the chamfered edge first, is forced into the resin through the collar having the inner diameter whereby the edge can be inserted, to cover the core with the resin.

The weight rollers covered with a resin according to the first aspect operate in the following manner when used in an automatic transmission or a centrifugal clutch:

Nylon 46 resin being the base resin has heat resistance and has strength against repeated impact loads and maintains stable properties over a long period, and aramid resin being present in the nylon 46 resin significantly improves the strength against repeated impact loads, load bearing capacity and heat resistance of the base resin. Furthermore, the aramid resin, because of properties thereof, does not wear or damage the counterpart that contacts the resin, in comparison with glass fiber or carbon fiber.

Moreover, in nylon 46 resin being the base resin, is contained polytetrafluoroethylene, and as this polytetrafluoroethylene is insoluble and unmeltable, polytetrafluoroethylene is microscopically dispersed in the nylon 46 resin, giving the whole resin self-lubricating property, reducing the coefficient of friction of the weight rollers, and improving the wear resistance thereof.

On the other hand, when polyolefine resin is added, as a self-lubricant, to nylon 46 resin, this polyolefine resin is melted into nylon 46 resin and further improves the stability of the coefficient of friction of the surface of the weight rollers even when the temperature of the resin on the surface of the weight rollers is elevated. Moreover, as described above, when aramid fiber, polytetrafluoroethylene resin, and, if necessary, polyolefin resin are mixed in nylon 46 resin, polyethylene does not show phase separation, and the resulting resin acquires the fluidity of a molten resin, having excellent mechanical properties and heat resistance, and good sliding properties.

As a result, the weight rollers according to the present invention have, in comparison with the conventional weight rollers, exceptionally good properties in respect of heat resistance and load-bearing capacity, and have significantly improved resistance against repeated impact loads, and have a low coefficient of friction and good wear resistance. Furthermore, the weight rollers do not damage the contact surfaces of the guide plate and the pulley against which the weight rollers contact.

The weight rollers according to the second aspect enable simplified production of weight rollers wherein the core is covered by the resin by simply forcing the core into the cylinder of the resin from one end thereof.

Accordingly, there is no need to give the core knurling or the like, nor complex production processes such as inserting a preheated core in the mold beforehand and then injection-molding the resin to cover the core, to integrate the core and the covering resin with each other. In particular, when the inner diameter of the collar, being capable of receiving the core, is $D_2$, the inner diameter of the resin, being shaped into a cylinder, is $D_3$, and the outer diameter of the core, being formed into the cylinder or column, is $D_0$, the following dimensional relationships between $D_0$, $D_2$ and $D_3$ is:

$$D_0 - D_2 = D_0 \times (0.015 \text{ to } 0.035) \quad (1)$$

and $$D_3 - D_0 = 0 \text{ to } 0.3 \text{ mm} \quad (2)$$

will enable the core and the covering resin to be integrated with each other under stable conditions over a long period since no excessive stress will be exerted from the resin of the cylinder to the core, and the core and the resin will not separate from each other during service, and the core will not move out of the resin through the collars.

Moreover, the weight rollers arranged as described above, wherein the core and the covering resin are integrated with the former being fit into the latter, will moderate impacts and reduce noises when the weight rollers contact the fixed plate or the movable plate, or the friction plate or the counterpart plate. It should be noted that the weight rollers according to the second aspect are applicable to both the dry type and the wet type.

BRIEF DESCRIPTION OF THE INVENTION

The invention will be better understood from the following detailed description taken in conjunction with the accompanying drawings wherein:

FIG. 1 is a sectional side view illustrating a weight roller according to the present invention;

FIG. 2 is an end view of the weight roller;

FIG. 3 is an exploded sectional view illustrating the dimensional relationships of the core and the resin of the weight roller;

FIG. 4 is a table comparatively listing the compositions, lives, physical properties, wear amounts, etc. of weight rollers according to the present invention and of prior art weight rollers;

FIG. 5 is a table comparatively listing the properties of the weight rollers of the present invention and the prior art weight rollers;

FIG. 6 is a table showing the allowance for forced fitting of the collar on one end of the resin and the effect thereof;

FIG. 7 is a table showing the dimensions of the inner diameter of the resin and the outer diameter of the core and the effect thereof;

FIG. 8 is a view partially in section illustrating the construction of a V-belt type automatic transmission including weight according to this invention; and FIG. 9 is a sectional view along the line 9—9 of FIG. 8.

DETAILED DESCRIPTION OF THE DRAWINGS

In FIGS. 1 and 2, a weight roller 1 in accordance with this invention includes a resin 2 and a metallic core 3 having an appropriate mass, the resin 2 covering the circumferential surface of the core 3. The resin 2 has the compositions shown for the four embodiments listed in the table of FIG. 4.

As indicated in the first column of FIG. 4, in Embodiment 1 the resin is comprised of, in weight percent, 85% of nylon 46 resin as the base resin, 5% of aramid fiber as a reinforcing material, and 10% of polytetrafluoroethylene resin as a self-lubricant.

The production process comprises the following steps: First, the aforementioned portions of nylon 46 resin, aramid fiber and polytetrafluoroethylene resin are subjected to dispersion and kneading by means of a twin-screw extruder to produce pellets of self-lubricating resin. Next, the pellets are predried at 120° C. for three to five hours, then subjected to injection-molding with a mold to be formed into a cylindrical resin part 2 with collars 2a and 2b indicated in FIGS. 1, 2 and 3.

In Embodiment 2 shown in FIG. 4, the resin is comprised of, by weight percent, 80% of nylon 46 resin, 5% of aramid fiber, and 15% of polytetrafluoroethylene resin as a self-lubricant.

The production process is identical to that of the aforementioned Embodiment 1.

In Embodiment 3 shown in FIG. 4, the resin is comprised of, by weight percent, 76% of nylon 46 resin, 5% of aramid fiber, 15% of polytetrafluoroethylene resin as a self-lubricant, and 4% of high-density polyethylene resin which is a kind of polyolefine resin as an auxiliary lubricant.

The production process is identical to that of the aforementioned Embodiment 1, and the high-density polyethylene resin is added together with other materials.

In Embodiment 4 shown in FIG. 4, the resin is comprised of, by weight percent, 72% of nylon 46 resin, 5% of aramid fiber, 15% of polytetrafluoroethylene resin as a self-lubricant, and 8% of high-density polyethylene resin as an auxiliary lubricant.

The production process is identical to that of the aforementioned Embodiment 3.

In the aforementioned embodiments, regarding the resins, "STANYL (trade name)" of "DSM" is used as nylon 46 resin, "Technola T-322" (trade name)" of "Teijin" or "Kevlar (trade name)" or "Nomex (trade name)" of "du Pont", "Alenka" of "Afzo", etc. may be used)) as aramid fiber, "Fluon L-169 (trade name)" of "Asahi Glass" as polytetrafluoroethylene resin, "Hizex 3300FP (trade name)" of "Mitsui Sekiyu Kagaku" as high density polyethylene resin, respectively. The polytetrafluoroethylene resin is preferably of powder, and its mean particle diameter is less than 15 $\mu$m, preferably less than 10 $\mu$m.

As for the physical dimensions of a specific example of the weight roller 1 covered with the resins, as illustrated in FIGS. 1 and 2, the length l is 13 mm, the outer diameter $D_1$ is 16.1 mm, and the total weight W is 8.5 g. This weight roller 1 has the following mechanical construction:

As illustrated in FIG. 3, the resin 2 is formed beforehand into a cylinder having inwardly protruding annular collars 2a and 2b on both ends thereof, and the core 3 has a weight of 7.43 g. is made of SUM-25 [free cutting carbon steel, chemical components of which are C (0.15% or less), Mn (0.90%–1.40%), (0.07%–0.12%) and S (0.30%–0.40%)] and is chamfered at both outer circumferential edges. As for dimensions, when the outer diameter of the core 3 is $D_0$, the inner diameter $D_3$ of the resin cylinder is made to meet "$D_3-D_0=0$ to 00.3 mm", and the inner diameter $D_2$ of the collar 2a on one side (the left or fitting side) of the resin is arranged to meet "$D_0-D_2=D_0 \times$ (0.015 to 0.035)". This arrangement of the covering resin 2 and the core 3 makes it possible to easily assembly the core 3 with the resin 2 by lightly forcing the core 3 into the resin 2 from the collar 2a having the inner diameter $D_2$ (fitting side) and fitting the core 3 in the inner cylindrical space of the resin 2. In other words, the core 3 with its circumferential edges chamfered is placed against one collar 2a having the inner diameter $D_2$ (fitting side), and a light pressure is applied to the collar 2a. As a result, the collar 2a of the resin 2 will be deformed elastically to receive the core 3 being forced into the resin 2. Thus the core 3 can be easily assembled in the self-lubricating resin 2.

The weight rollers that are arranged to have the aforementioned dimensions and to be assembled by forced fitting are capable of maintaining a stable and integral coupling over a long period. Thus, when the weight rollers are installed in a transmission, the centrifugal force does not cause the cores 3 to thrust or rotate relative to the resins 2.

Regarding the dimensions, when the differential "$D_3-D_0$" between the inner diameter $D_3$ of the resin 2 and the outer diameter $D_0$ of the core 3 is less than 0 mm, the core will cause a stress in the resin 2 to shorten its life. On the other hand, when the differential is more than 0.3 mm, the weight rollers as mounted in the transmission will cause noises, etc. since the centrifugal force, etc. will thrust or rotate the core 3 relative to the resin 2.

When the differential "$D_0-D_2$" between the outer diameter $D_0$ of the core 3 and the inner diameter $D_2$ of the collar 2a on the forced fitting side is less than "$D_0\times 0.015$", the core may come out of the resin 2. On the other hand, when the differential is more than "$D_0\times 0.035$", an unnecessarily large force is required to assemble and may generate cracks in the resin, causing a breakage during use. FIGS. 6 and 7 show the results of experiments that were conducted by the present inventors to confirm that the aforementioned conditions are optimal ranges regarding the dimensions.

From the point of view of automation of assembly, it is desirable to chamfer both ends of the core 3, as indicated at 3a in FIG. 3, since the core may be forced into the resin, with either end first, during production. Although in FIGS. 1-3, only one collar 2a of the resin 2 is arranged to have such dimensions that allow forced fitting of the core 3, it is also desirable, from the view of automation of assembly, that both ends of the resin have the dimensions of collar 2a such that allow forced fitting.

The rotational speed of the rotary shaft onto which the weight rollers are mounted is approximately 5000 rpm during high speed cruising.

When the physical properties of the weight rollers having the compositions of Embodiment 1 through Embodiment 4 were measured, the results were as indicated in the middle row of the left column of FIG. 4 (see the data for tensile strength, bending strength, modulus of elasticity, impact strength and fatigue life). Such results were obtained by using a tensile tester of the constant stress and amplitude type, under conditions of vibration frequency of 1000 times/sec., tensile stress of 133 kgf/cm$^2$, and room temperature of 25° C.

These weight rollers were installed in an automatic transmission of a small motorbike with piston displacement of 50 cc, and the bike was run for 5000 km. Before and after the running, the wear amount, and the deterioration in the speed ratio (the ratio defined by the following equation (3): in this instance, the speed ratio at the revolution speed of 5000 rpm) were measured.

Deterioration in the speed ratio = (Initial speed ratio - Speed ratio after running)/Initial speed ratio   (3)

The results were as shown in the lower row of the left column of FIG. 4.

The results of tests with the Suzuki type abrasion tester shown in FIG. 4 were obtained under stress P=6.0 kg/cm$^2$, revolution speed V=60 rpm. room temperature t=25° C., humidity of 50% RH, and operation time of 50 hr. The wear amounts were measured by a three coordinate meter.

In contrast with the aforementioned embodiments, weight rollers comprised of resins of various conventional compositions showed values listed in the right-hand column (Control 1 through Control 4) of FIG. 4. For example, in the case of the weight roller of Embodiment 3 of the present invention, the wear amounts after 5000 km running as field running characteristics were very small; the wear amount of the circumferential surface (resin) of the weight roller was 0.03 mm, and the wear amount of the contact surface of an aluminum pulley used in the V-belt type automatic transmission was 0.002 mm.

The aforementioned deterioration in the speed ratio was limited to 4 to 6% of reduction, and it was confirmed that a stable speed ratio can be obtained over a long period. Furthermore, any separation between the core and the resin was not observed, and it was confirmed that the core and the resin functioned well in a stable integrated state.

In contrast, in the case of the composition of Control 2 of FIG. 4, an example of conventional art, regarding the field running characteristics, the wear amounts of the circumferential surface of the weight roller (resin) were 0.23 mm on the side contacting the aluminum movable plate, and 0.28 mm on the side contacting the iron guide plate; thus the weight rollers were worn into irregular forms. With regard to the deterioration in speed ratio, a large reduction of 13 to 14% was observed. Moreover, the grease caught dust particles during running and was contaminated to a black color, and at the same time, the grease was biased towards the outer circumference of the movable pulley by the centrifugal force.

Accordingly, a stable performance cannot be expected over a long period.

In the case of the composition of Control 3 of FIG. 4, another example of the prior art, the wear amount of the circumferential surface of the weight roller (resin) was 0.12 mm, and the wear amount of the contact surface of the aluminum plate used in the V-belt type automatic transmission was 0.05 mm; thus in comparison with the weight roller of Embodiment 3 according to the present invention, the wear amounts were four times on the weight roller, and as high as 25 times on the plate side of aluminum. Furthermore, a plurality of scratches were observed on a portion that contacted the weight rollers, the scratches being caused by glass fiber used as a reinforcing material.

Regarding the deterioration in speed ratio, a reduction as large as 12 to 13% was observed. The reduction in speed ratio was attributed to that although the respective weight rollers all shifted in the radial directions under the influence of the centrifugal forces, the wear on the weight rollers and on the movable pulley prevented the pitch diameter of the movable pulley from being expanded equally at various points relative to the initial period.

It was also confirmed that aluminum dusts produced by wear remained over the slide surface, acting as an abrasive during the following running to accelerate the wear, thus the change in speed ratio was accelerated. Accordingly, the weight roller of Control 3, example of the prior art, is very inferior to the weight roller of the aforementioned embodiment (Embodiment 3) according to the present invention, and a stable performance over a long period cannot be expected.

As described above, the automatic transmission using weight rollers according to the present invention shows stabler coefficient of friction and speed changing efficiency in comparison with those of the conventional type with sealed grease, since grease is not scattered by the centrifugal force and film lubrication is not impaired. Furthermore, the wear amounts are small even after running over a long time, and the deterioration in speed ratio is about 4 to 6%, which is about one quarter to one third of that of the conventional type.

In the aforementioned Embodiments 1 through 4, preferred mixing ratios of the resin that covers the surface of the weight rollers are indicated, and the effect unique to the present invention is obtainable when, in weight percent, "nylon 46 resin" is 100, "aramid fiber"

is from 1 to 80, "polytetrafluoroethylene resin" is from 3 to 80, and "high density polyethylene resin" is from 0 to 20.

When weight rollers are produced by, as described above, forcing a core into a cylindrical resin with collars, the resulting weight rollers show better effects than those produced by the insert molding as described in the aforementioned example of prior art, in terms of the shrinkage rate of the outer diameter, out of roundness, etc. of the produced weight roller, and the properties after 5000 km running test in the automatic transmission of the small motorbike, as illustrated in FIG. 5. In the case of the weight roller produced by the conventional insert molding, as the weight roller is molded with a metallic core placed inside, the shrinkage rate of the outer diameter of the weight roller is smaller than that of the resin itself, and thus is smaller than that of weight roller of the embodiments according to the present invention. As a result, the weight rollers produced by the insert molding method have a large internal stress in the resin portion. Furthermore, with regard to the out of roundness, in the case of the weight roller produced by the insert molding method, if the internal stress in the resin portion is controlled in an attempt to make the outer diameter shrinkage rate greater, the value of out of roundness will become larger (moving away from the true circle), thus it is difficult to reduce the value of out of roundness and at the same time to make the outer diameter shrinkage rate larger. In contrast, in the case of the weight rollers of the embodiments according to the present invention, both out of roundness and outer diameter shrinkage rate may be set at satisfactory values.

As a result, the weight rollers produced by the conventional insert molding method, in the running test, showed damages after 1000 to 1500 km of running, or cracks after 5000 km of running, and large biased wear, whereas the weight rollers according to the present invention did not show such damages, cracks nor large (affecting the functions) biased wear.

In particular, regarding the results after 9000 km running shown in the bottom row of FIG. 5, the weight rollers produced by the conventional insert molding method became unusable or near to it. In contrast, the weight rollers of the embodiment according to the present invention still remained usable without any troubles. The weight rollers used in the test of FIG. 5 were produced under the conditions:

$$D_3 - D_0 = 0.03 \text{ mm and}$$

$$D_0 - D_2 = D_0 \times 0.025.$$

The outer diameter shrinkage ratio is expressed by

Outer diameter shrinkage ratio $= (D_k - D_1)/D_k$ where $D_k$ is the dimension corresponding to the outer diameter of the weight roller portion of the mold for molding the resin portion of the weight roller.

In FIG. 5, "gate form" indicates the form of injection into the mold during injection molding of the resin portion, and there are some kinds including so-called "disk", "edge", and "pin point". In FIG. 5, "core surface" indicates whether the surface of the core is flat or is machined such as knurling. The out of roundness indicates the results obtained from those measured by a three coordinate meter.

As described above, the weight rollers of the present embodiments have excellent functions and advantages in comparison with the conventional weight rollers.

The weight rollers according to the first invention excel, as described above, in heat resistance, wear resistance, and fatigue resistance (load bearing capacity), and have a low coefficient of friction, and do not damage the surfaces of the contacting counterparts.

Accordingly, when used as weight rollers in a V-belt type automatic transmission or a centrifugal clutch, the weight rollers guarantee stable use over a long period, and do not require any maintenance such as replacement of the weight rollers or refilling of grease over a long time.

Hence small motorbikes that are provided with an automatic transmission or a centrifugal clutch having these weight rollers exhibit a very high reliability and are free of maintenance.

The weight rollers according to the second invention enable simple production of weight rollers having the aforementioned excellent functions, thus such weight rollers can be provided inexpensively. Furthermore, as the integration of the resin and the core is guaranteed over a long period, the weight rollers according to the second invention contribute to the improvement in reliability of the transmission in combination with the function and advantage of the weight rollers according to the first aspect of the invention.

What is claimed is:

1. A weight roller for use in an automatic transmission having a pulley of which the pulley groove width varies as a movable plate moves relative to a fixed plate, or in a centrifugal clutch of a type wherein a friction plate and a counterpart plate arranged opposingly to each other on two concentric shafts are pressed together or released from each other to connect or disconnect said two shafts, as a member for responding to the revolution speed that actuates a movable member or members such as said movable plate or said friction plate and counterpart plate, said weight roller comprising a core of which the circumference thereof is covered with a resin, said resin forming a hollow cylinder having inwardly protruding collars on both ends thereof, said core being formed into a cylinder mountable inside said resin, said core being chamfered at least on one circumferential edge thereof, and at least one of said collars has an inner diameter whereby said core, with its chamfered edge first, is capable of being forced into the collar which is elastically deformed, and said core, with the chamfered edge first, is forced into said resin through said collar having said inner diameter whereby said edge can be inserted, to cover the core with the resin wherein said inner diameter of said collars is $D_2$, the inner diameter of said resin is $D_3$, and the outer diameter of the core is $D_0$, the dimensional relationship between $D_0$, $D_2$ and $D_3$ being defined as follows:

$$D_0 - D_2 = D_0 \times (0.015 \text{ to } 0.035) \text{ and}$$

$$D_3 - D_0 = 0 \text{ to } 0.3 \text{ mm.}$$

2. A weight roller as set forth in claim 1, wherein said resin contains a reinforcing material comprising aramid fiber and a self-lubricant comprising polytetrafluoroethylene resin, and said resin including a base resin thereof comprising nylon 46 resin.

* * * * *